United States Patent [19]

Levosinski

[11] Patent Number: 5,129,674
[45] Date of Patent: Jul. 14, 1992

[54] REACTION DEVICE FOR AIR BAG MODULE

[75] Inventor: George J. Levosinski, Marine City, Mich.

[73] Assignee: TRW Vehicle Safety Systems Inc., Lyndhurst, Ohio

[21] Appl. No.: 618,643

[22] Filed: Nov. 27, 1990

[51] Int. Cl.⁵ .................................................. B60R 21/30
[52] U.S. Cl. .................................... 280/738; 280/732; 280/743
[58] Field of Search ................. 280/731, 732, 738, 743

[56] References Cited

U.S. PATENT DOCUMENTS

| | | | |
|---|---|---|---|
| 2,859,908 | 11/1958 | Neigel | 417/185 |
| 3,632,133 | 1/1972 | Haas | 280/738 |
| 3,638,964 | 1/1972 | Chute | 280/736 |
| 3,773,351 | 11/1973 | Catanzarite | 280/738 |
| 3,791,669 | 2/1974 | Hamilton | 280/738 |
| 3,807,755 | 4/1974 | Mason, Jr. | 280/736 |
| 3,847,411 | 11/1974 | Herrmann | 280/735 |
| 3,910,595 | 10/1975 | Katter et al. | 280/732 |
| 3,961,806 | 6/1976 | Katter | 280/732 |
| 4,043,572 | 8/1977 | Hattori et al. | 280/738 |
| 4,833,996 | 5/1989 | Hayashi et al. | 102/530 |
| 4,915,410 | 4/1990 | Bachelder | 280/732 |
| 4,928,991 | 5/1990 | Thorn | 280/738 |

FOREIGN PATENT DOCUMENTS

| | | | |
|---|---|---|---|
| 1016567 | 8/1977 | Canada | |
| 1324401 | 7/1973 | United Kingdom | 280/738 |
| 1420340 | 1/1976 | United Kingdom | 280/738 |

Primary Examiner—Kenneth R. Rice
Attorney, Agent, or Firm—Calfee Halter & Griswold

[57] ABSTRACT

A reaction device for an air bag module includes a pair of spaced apart side walls adapted to support a cylindrical air bag inflator. A pair of spaced apart transverse walls extend between and connect the side walls. The side walls and the transverse walls cooperate to define (i) an air intake opening, (ii) a gas outlet opening, (iii) a venturi channel terminating in the gas outlet opening, and (iv) an air aspiration passage between the air intake opening and the venturi channel. The side walls are adapted to support the cylindrical inflator in a manner such that the cylindrical housing of the inflator spans the width of the reaction device. In addition, the gas dispensing nozzles of the inflator face the throat of the venturi channel. The reaction device, and the orientation of the inflator in the reaction device, facilitate the aspiration of significant quantities of ambient air during operation of the inflator.

19 Claims, 5 Drawing Sheets

REACTION DEVICE FOR AIR BAG MODULE

TECHNICAL FIELD

The present invention relates to a reaction device for a vehicle air bag module, and particularly to a reaction device which supports an air bag inflator and which also forms an aspirator for drawing ambient air from the vehicle and using the ambient air as part of the inflation fluid which inflates the air bag.

BACKGROUND

A vehicle air bag system functions to protect a vehicle occupant from injury during a crash or collision. The principal components of a vehicle air bag system are an air bag and an inflator. The air bag is stored in a deflated condition at a storage location in the vehicle dashboard or steering wheel. At the onset of a collision, the inflator rapidly generates a large quantity of gas. The gas is directed into the air bag to deploy the air bag into a position in front of a vehicle occupant, and simultaneously to inflate the air bag. When inflated, the air bag restrains the vehicle occupant against impact with a relatively rigid part of the vehicle.

In many known air bag systems, aspirated air, i.e. ambient air drawn from outside the inflator, is used in the inflation process. Specifically, gas generated or released by the inflator induces a flow of ambient air from outside the inflator. The ambient air combines with the gas from the inflator to form an inflation fluid. The inflation fluid is directed into the air bag to deploy and to inflate the air bag.

An example of an aspiration air bag system is disclosed in U.S. Pat. No. 3,632,133 to Hass. The Hass patent discloses a passenger side air bag system comprising a receptacle built into the vehicle dashboard and a folded air bag. The system also comprises a nozzle-shaped aspirator member located in the receptacle, and a cover which closes the receptacle and forms part of the dashboard. The nozzle-shaped member is in fluid communication with the passenger compartment, through passageways in the dashboard. An inflator is connected to, and disposed within, the nozzle-shaped member. The inflator has a cylindrical housing and a gas discharge mechanism formed at one end of the cylindrical housing. The gas discharge mechanism communicates with the throat of the nozzle-shaped member. When the inflator is actuated, gas from the inflator is directed through the gas discharge mechanism of the inflator and into the throat of the nozzle-shaped member. Air is drawn into the nozzle-shaped member and combines with the gas from the inflator to form an inflation fluid which is directed into the air bag, to deploy and to inflate the air bag.

The aspiration air bag system shown in the Hass patent is installed in a vehicle by installing the various components of the system, in stages, into the vehicle dashboard. However, it is now desirable to have air bag modules which can be assembled outside the vehicle and then be loaded as complete units into vehicles. Such air bag modules can be assembled, and installed in a vehicle, by mass production techniques. Also, such air bag modules can be efficiently replaced, after their air bags have been deployed.

One well known air bag module construction comprises a metal reaction can in which an air bag and an inflator are loaded, and a cover which closes the can to complete the module. The reaction can is adapted to be coupled to a structural part of a vehicle, to couple the module to the vehicle. Another known module construction is illustrated in U.S. Pat. No. 4,915,410. A reaction plate and a cup-shaped cover are coupled together to define a cavity for an inflator and an air bag. The air bag and the inflator are coupled to the reaction plate. The reaction plate is adapted to be connected to a structural part of the vehicle to couple the module to the vehicle. In either of the foregoing module constructions, the reaction device, i.e. either the reaction can or the reaction plate, is the structural element to which the air bag and the inflator are coupled and which is coupled to the vehicle to incorporate the module into the vehicle.

SUMMARY OF THE PRESENT INVENTION

The present invention provides a new and useful reaction device which supports an air bag inflator and which forms an aspirator for an air bag module. The reaction device is particularly designed to support a cylindrical inflator and to form an aspirator which efficiently draws significant quantities of ambient air, combines the air with gas from the inflator to form an inflation fluid, and directs the inflation fluid into a vehicle air bag.

The reaction device comprises a pair of spaced apart side walls and a pair of spaced apart transverse walls extending between and connecting the side walls. The side walls and the transverse walls cooperate to define (i) an air intake opening, (ii) a gas outlet opening, (iii) a venturi channel terminating in the gas outlet opening, and (iv) an aspiration passage between the air intake opening and the venturi channel. The side walls are designed to support a cylindrical inflator in the aspiration passage in a particular orientation. The orientation of the inflator is such that gas from the inflator is directed into the throat of the venturi channel and a significant volume of aspirated air can flow efficiently about the inflator and into the venturi channel.

According to the preferred embodiment, the side walls are substantially parallel to each other. The transverse walls have continuous inner surfaces which face each other and span the width of the reaction device (i.e., the distance between the parallel side walls). The continuous inner surfaces of the transverse walls define a venturi channel comprising a converging portion, a diverging portion, and a curved throat portion joining the converging and diverging portions. The parallel side walls support a cylindrical inflator with its cylindrical outer housing spanning the width of the reaction device and disposed transverse to the direction of flow of aspiration air. The cylindrical inflator housing has gas dispensing nozzles facing the throat of the venturi channel. Gas from within the inflator flows through the gas dispensing nozzles and is directed into the throat of the venturi channel. The gas induces a flow of ambient air about the inflator housing and into the venturi channel. The air flows relatively smoothly around the cylindrical inflator (like air flow around an airfoil), and is drawn efficiently into the venturi channel. In the venturi channel, the air combines with the gas from the inflator to form an inflation fluid. The inflation fluid flows out of the venturi channel and into an air bag.

Further features of the present invention will become apparent from the following detailed description and the accompanying drawings.

DETAILED DESCRIPTION OF THE PREFERRED EMBODIMENT

Figure 2:
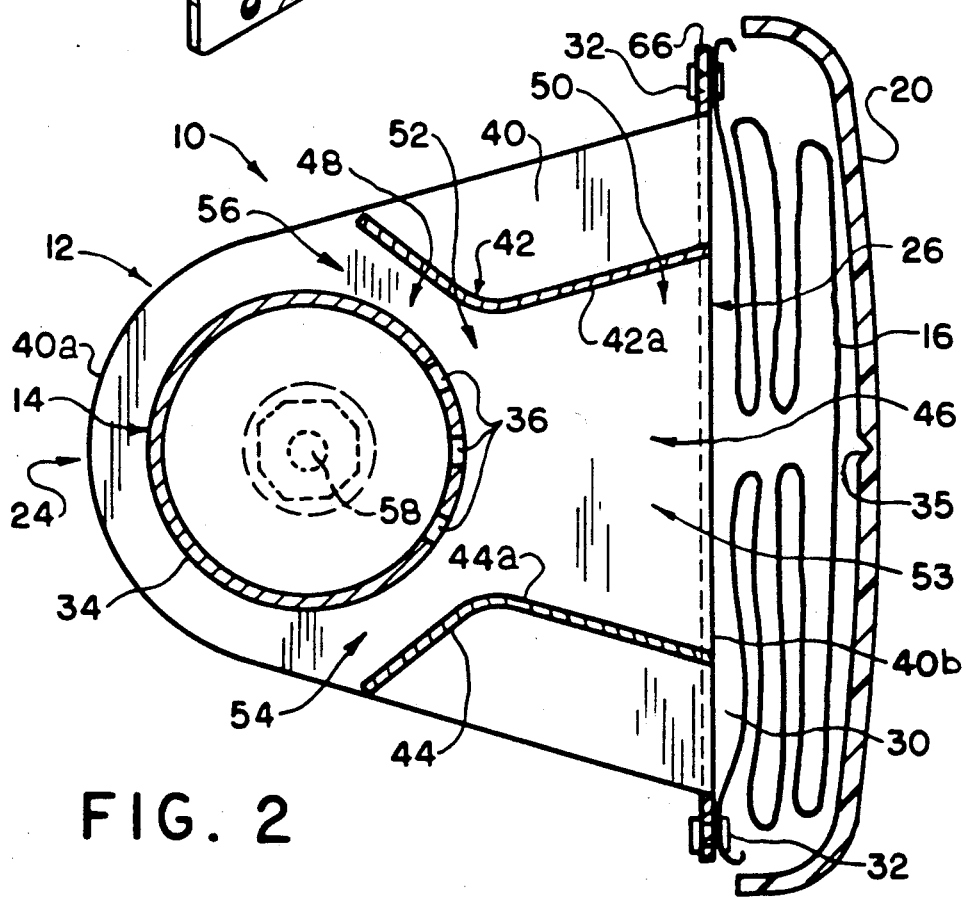
FIG. 2 is a schematic sectional view of an air bag module with a reaction device according to the present invention.
Figure 3:
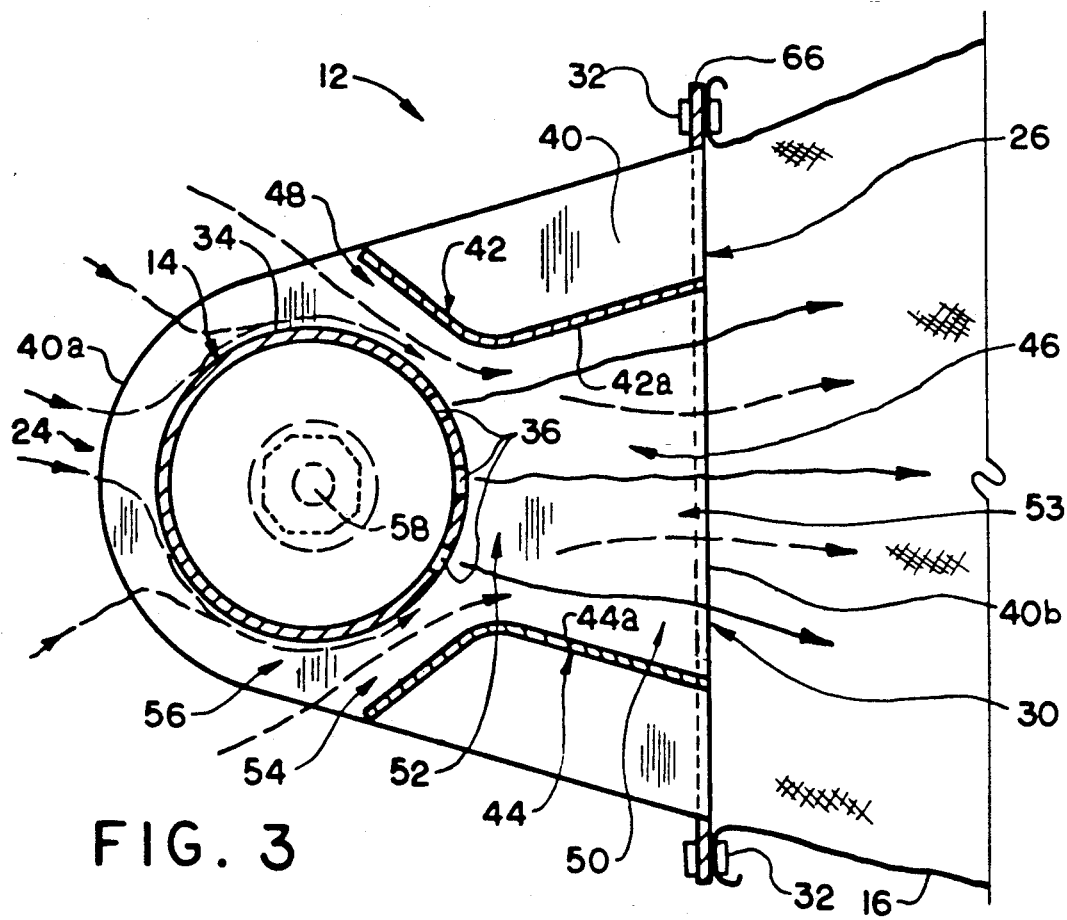
FIG. 3 is a schematic, fragmentary illustration of the air bag module of FIG. 2, showing the flow of gas generated by the inflator and aspiration air during inflation of an air bag.

As illustrated in FIG. 2, a vehicle air bag module 10 comprises a reaction device 12, constructed according to the invention, with an inflator (shown schematically at 14) and a folded air bag 16. A cover 20 (shown in phantom) is coupled to the reaction device 12 to complete the air bag module 10.

The air bag module 10 is assembled outside of a vehicle, and installed in the vehicle as a complete unit. When the module 10 is installed in a vehicle, the reaction device 12 is coupled to a structural portion of the vehicle and transmits forces between the module 10 and the structural portion of the vehicle. The structure for coupling the reaction device 12 to a vehicle can be any of a number of known structures, including the structure illustrated in U.S. Pat. No. 4,842,300, which is a preferred construction.

The reaction device 12 has a rear end 24 and a front end 26. The inflator 14 is located near the rear end 24 of the reaction device 12. The air bag 16, which is preferably made of a fabric such as nylon, is located near the front end 26 of the reaction device 12. The air bag 16 has a gas inlet opening (or mouth) 30 which is fixed to the reaction device 12 by bolts 32 or similar fasteners.

The inflator 14 comprises a cylindrical housing 34 that encloses a gas generant and filter structure (not shown). The gas generant and the filter structure can be any of a number of known constructions, including the construction disclosed in U.S. Pat. No. 4,696,705, which is a preferred construction. Alternatively, the inflator may contain a quantity of gas under pressure.

At the onset of a collision, the gas generant is ignited and generates large quantities of an inert gas such as nitrogen. The gas is filtered and directed rapidly out of the cylindrical housing 34 through gas dispensing nozzles 36 formed in the housing 34. The gas directed from the cylindrical housing 34 induces a flow of aspirated air through the reaction device 12, in a manner described more fully hereinafter. The gas from the inflator and the aspirated air are directed into the air bag 16 and cause the air bag to exert pressure on the cover 20. The cover 20 has a designed weakness (e.g., groove 35) which enables the cover 20 to separate into segments when pressure is applied to it. The air bag 16 can thus push through the cover and inflate.

The reaction device 12 includes two spaced apart, parallel side walls 38, 40 and two spaced apart transverse walls 42, 44 extending between and interconnecting the side walls. The shape of the side walls 38, 40 is primarily dictated by the space in the vehicle reserved for the reaction device 12. In the illustrated embodiment, each of the side walls 38, 40 has a rounded rear edge 38a, 40a, respectively. Each side wall tapers outward from its rear edge and terminates at a flat front edge 38b, 40b. Further, each side wall 38, 40 extends from the rear end 24 of the reaction device 12 to the front end 26 of the reaction device.

The transverse walls 42, 44 are each substantially continuous, and have inner surfaces 42a, 44a which are in facing relationship to each other. The inner surfaces 42a, 44a define a venturi channel 46 (see FIG. 2) with a converging portion 48, a diverging portion 50, and a throat 52 joining the converging and diverging portions. The venturi channel 46 spans the width of the reaction device 12, i.e., the venturi channel 46 extends from one side wall 38 to the other side wall 40. The diverging portion 50 of the venturi channel 46 terminates in a gas discharge opening 53. The wide end 54 of the converging portion 48 of the venturi channel 46 and the ]rounded rear edges 38a, 40a of the side walls 38, 40 co-operate to define an air intake 56 at the rear end 24 of the reaction device 12. The air intake 56 is in fluid communication with the wide end 54 of the converging portion of the venturi channel 46.

Figure 4:
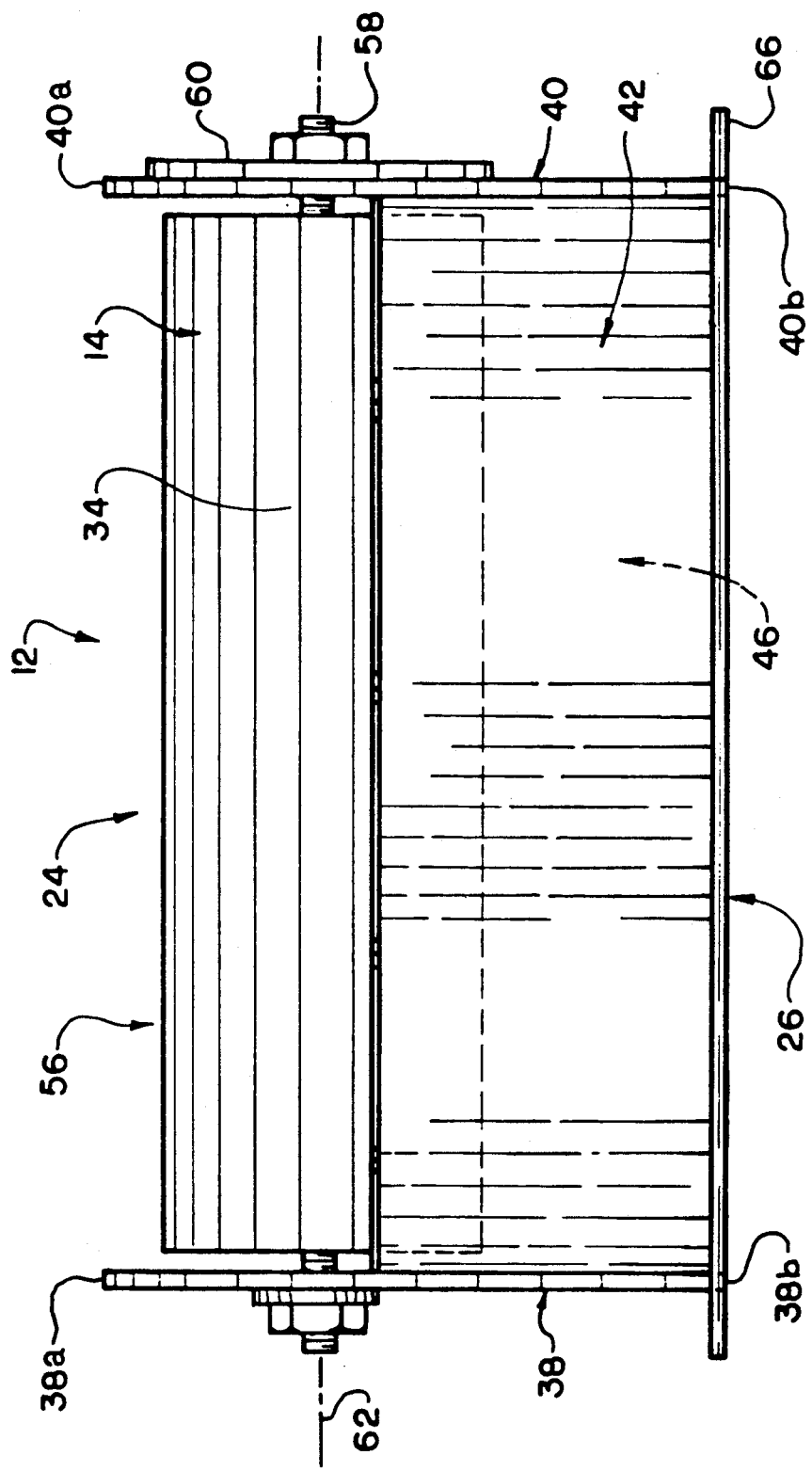
FIG. 4 is a top view of the structure of FIG. 1.
Figure 5:
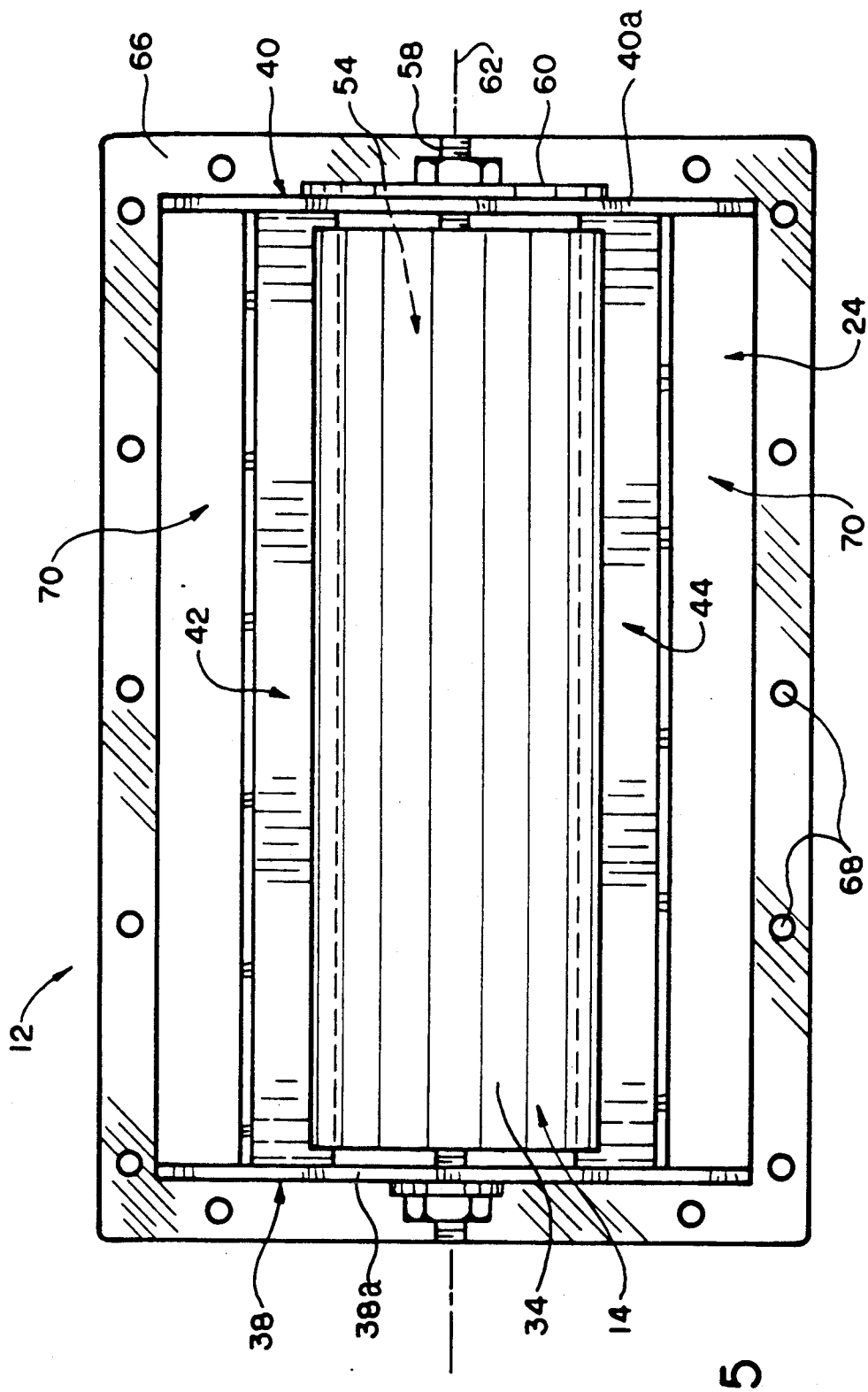
FIG. 5 is a rear view of the structure of FIG. 1.
Figure 6:
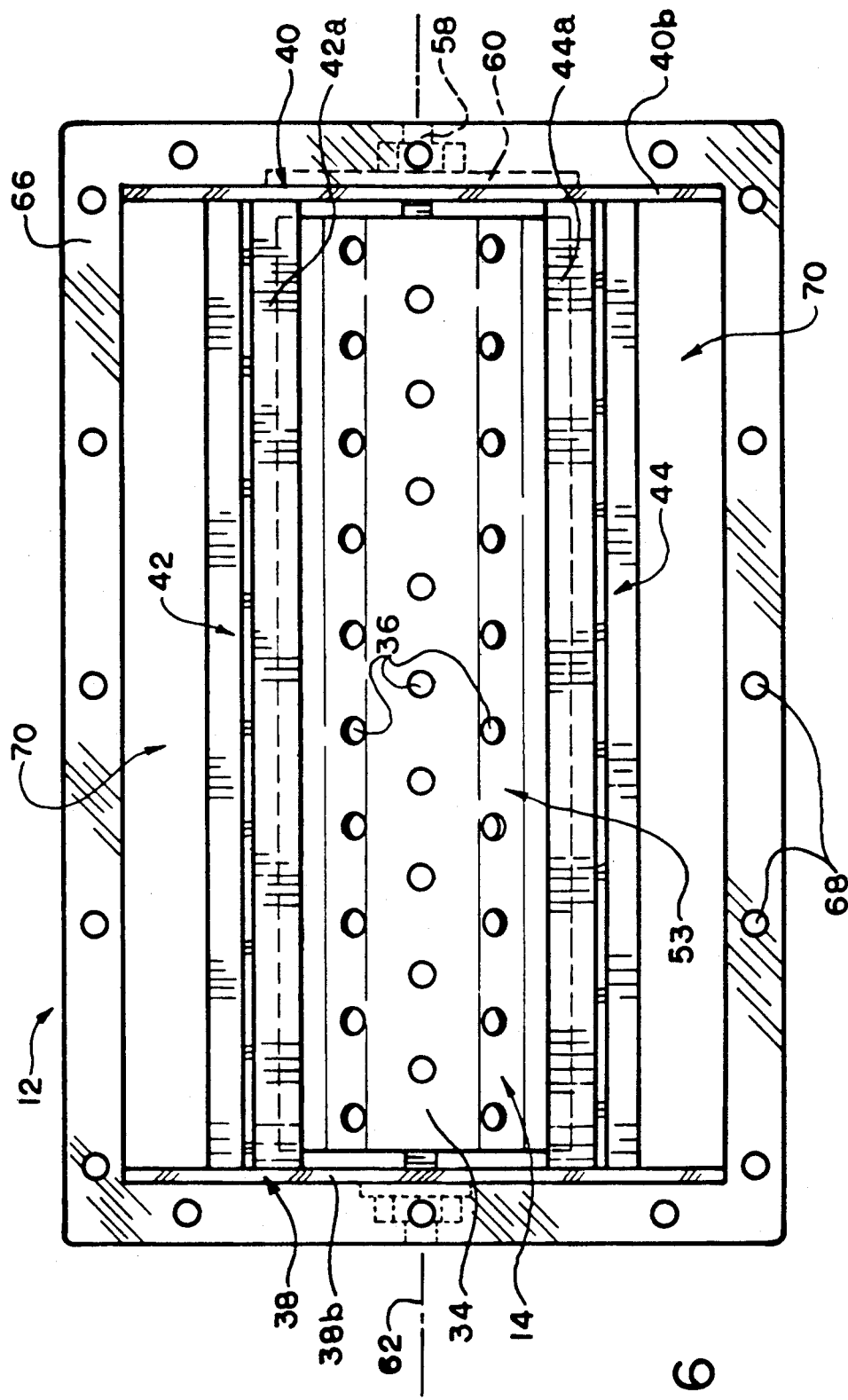
FIG. 6 is a front view of the structure of FIG. 1.

The inflator 14 is inserted into the reaction device 12 through a hole (not shown) in the side wall 40. One end of the inflator housing 34 has a threaded shaft 58 which enables the inflator 14 to be secured by a nut to the opposite side wall 38. The other end of the inflator 14 is adapted to be bolted, riveted, or otherwise fastened to an end cap 60 (FIGS. 4–6). The end cap 60 closes the hole formed in the side wall 40 after the inflator 14 has been inserted into the reaction device 12. Such structure is well known to those of ordinary skill in the air bag art. When the inflator 14 is properly located in the reaction device 12, the cylindrical housing 34 of the inflator spans the width of the reaction device 12, and a central axis 62 of the inflator is disposed perpendicular to the side walls 38, 40. In addition, the cylindrical housing 34 extends partially into the converging portion 48 of the venturi channel 46, and the gas dispensing nozzles 36 face the throat 52 of the venturi channel 46. The inflator 14 may have a locator boss (not shown) designed to be received in a recess in a member (not shown) fixed to one of the side walls. Such a boss and recess ensure that the inflator is properly located in the reaction device 12. The gas discharge opening 53 of the venturi channel 46 has a flow area significantly less than the flow area of the air intake 56.

Thus, as seen from the foregoing discussion, both the inflator 14 and the venturi channel 46 are aligned with each other and both span the width of the reaction device 12. The air intake 56 at the rear end 24 of the reaction device is open, and an aspiration passage extends from the air intake 56, around the cylindrical inflator housing 34 and into the venturi channel 46. If desired, a screen filter (not shown) can be placed over the air intake 56 to filter particles from the air being drawn through the air intake 56.

When the inflator 14 is activated, inert gas is generated and directed at high velocity through the gas dispensing nozzles 36 in the inflator housing 34. The generated gas is directed immediately into the throat 52 of the venturi channel 46. As the high velocity gas flows through the venturi channel 46, it generates low pressure in the venturi channel and induces a flow of ambient air through the air intake 56, about the cylindrical inflator housing 34 and into the venturi channel 46. The velocity of the ambient air increases as it flow through the converging portion 48 and into the throat 52 of the venturi channel 46. In the throat 52 of the venturi channel 46, the air is entrained by the generated gas to form an inflation fluid. The inflation fluid is then directed through the diverging portion 50 of the venturi channel 46 and the gas discharge opening 53 and into the air bag 16.

The foregoing structure is believed to provide efficient aspiration of significant quantities of ambient air into the air bag 16 along with generated gas from the inflator. The air intake opening 56 is approximately twice as large as the gas discharge opening 53, thereby to enable significant quantities of ambient air to be drawn into the reaction device 12. Because the transverse walls 42, 44 and the cylindrical housing 34 of the inflator 14 span the width of the reaction device, the flow of air through the aspiration passage occurs across the width of the reaction device 12. In addition, the flow of air about the cylindrical housing 34 is relatively smooth, and approximates the flow of air about an airfoil. The location of the gas dispensing nozzles 36 of the inflator 14 facing the throat 52 of the venturi channel 46 provides an efficient way for inducing flow of ambient air through the aspiration passage and the venturi channel 46.

Figure 1:
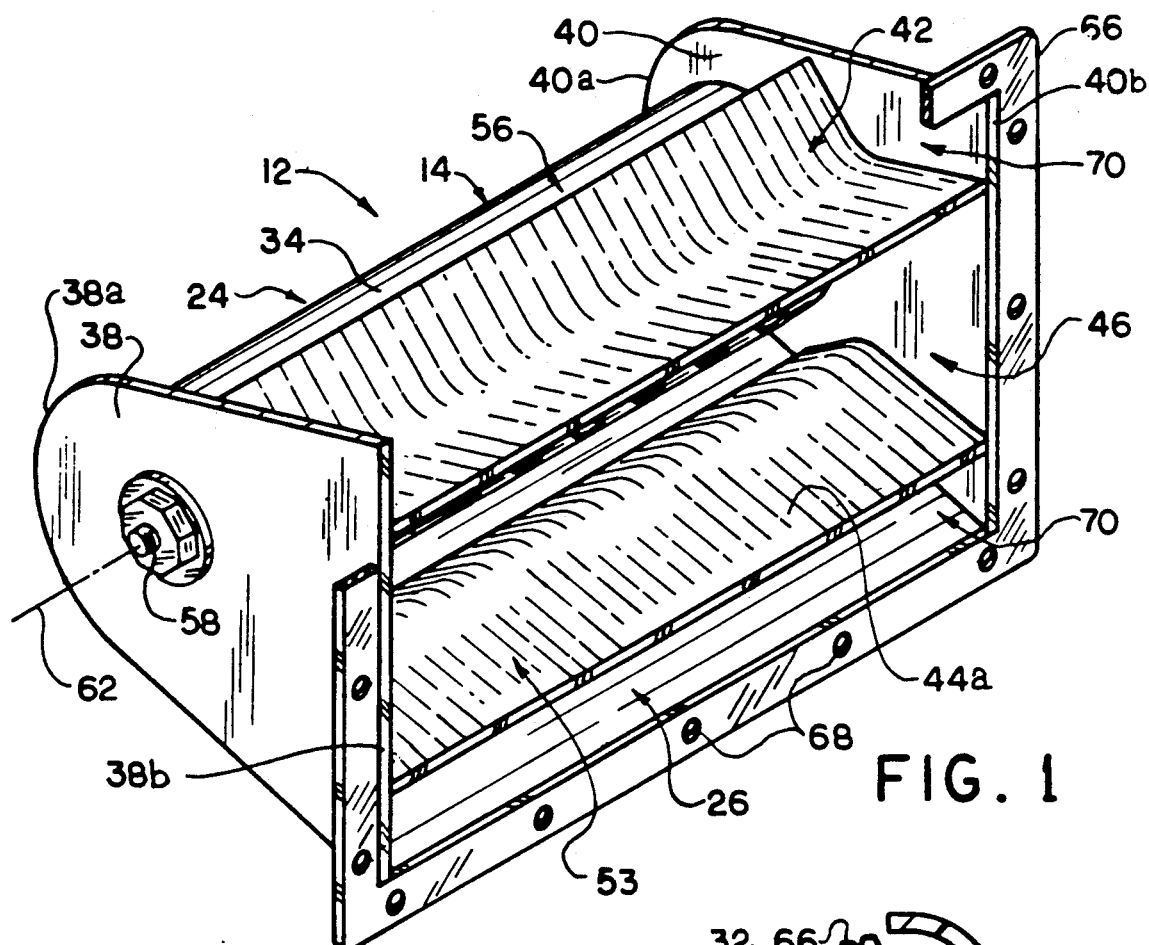
FIG. 1 is a schematic perspective view of a reaction device according to the present invention with a cylindrical inflator supported by the device.

As discussed above, the mouth 30 of the air bag 16 is fixed to the reaction device 12 by bolts 32 or similar fasteners. More specifically, the reaction device 12 has a peripheral flange 66 surrounding the gas discharge opening 53 of the venturi channel 46. The flange 66 has openings 68 which receive the bolts 32 that extend through the air bag material at the mouth 30 of the air bag 16. As seen in FIG. 1, there are spaces 70 between the top and bottom of the venturi channel 46 and the flange 66. Those spaces can either be open or closed, as necessary or desired, to allow for (i) aspiration of additional air or (ii) back flow of fluid out of the air bag 16 after the air bag has been inflated and then struck by a vehicle occupant. Moreover, flexible flapper valves (not shown) can be used to cover the spaces 70 but to allow restricted aspiration of additional air or restricted back flow of fluid from the air bag 16.

Figure 7:
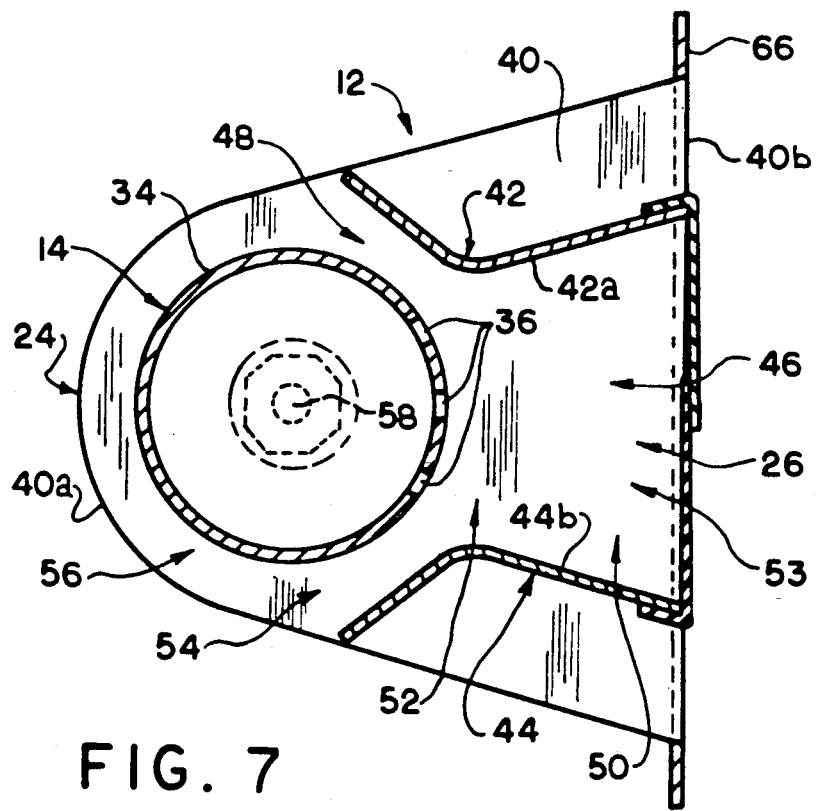
FIG. 7 is a schematic sectional view of a reaction device and an inflator, with flexible doors attached to the front end of the reaction device.

Also, as disclosed in FIG. 7, the gas discharge opening 53 of the venturi channel 46 can be covered with flexible doors which prevent or restrict back flow of fluid from the air bag 16 into the gas discharge opening 53 of the venturi channel 46.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A reaction device for an air bag module, comprising:
    pair of spaced apart side walls;
    a pair of spaced apart transverse walls extending between and connecting said side walls, said spaced apart side walls being adapted to support an air bag inflator;
    said spaced apart side walls and said spaced apart transverse walls cooperating to define:
    (i) an air intake opening,
    (ii) a gas outlet opening,
    (iii) a venturi channel terminating in said gas outlet opening, and
    (iv) an aspiration passage between said air intake opening and said venturi channel.

2. A reaction device as set forth in claim wherein said spaced apart transverse walls have respective inner surfaces which are substantially continuous and in facing relation to each other, the inner surfaces of said pair of transverse walls cooperating to define a converging portion of said venturi channel, a diverging portion of said venturi channel, and a throat portion of said venturi channel joining said converging and diverging portions.

3. A reaction device as set forth in claim 2, wherein said spaced apart side walls are parallel to each other and adapted to support a cylindrical inflator with its cylindrical housing extending between said side walls and with its gas dispensing nozzles facing said throat of said venturi channel.

4. A reaction device as set forth in claim 3, further including flange structure connected with the portions of said side walls and transverse walls defining said gas outlet opening, said flange structure being adapted for attachment to a vehicle air bag.

5. A reaction device as set forth in claim 2, wherein each of said side walls has a rear edge portion, each of said transverse walls has a rear edge defining the wide end of said converging portion of said venturi channel, said rear edges of said transverse walls and said rear edge portions of said side walls forming said air intake 6. A reaction device as set forth in claim 5, wherein the flow area of said air intake opening is substantially greater than the flow area of said gas outlet 7. Apparatus for forming an air bag module, comprising a reaction device and a cylindrical inflator connected to said reaction device,
    said reaction device comprising
    a pair of spaced apart side walls, and
    a pair of spaced apart transverse walls extending between and connecting said side walls
    said spaced apart side walls and said spaced apart transverse walls cooperating to define
    (i) an air intake opening,
    (ii) a gas outlet opening,
    (iii) a venturi channel terminating in said gas outlet opening, and ,
    (iv) an air aspiration passage between said air intake opening and said venturi channel;
    said cylindrical inflator having a cylindrical housing with gas dispensing nozzles formed in said housing, said cylindrical inflator being supported by said side walls with said cylindrical housing extending between said side walls.

8. Apparatus as set forth in claim 7, wherein said transverse walls have substantially continuous inner surfaces facing each other and cooperating to define a converging portion of said venturi channel, a diverging portion of said venturi channel and a throat section of said venturi channel joining said converging and diverging portions.

9. Apparatus as set forth in claim 8, wherein said inflator is located with (a) a part of its cylindrical housing disposed within the converging portion of said venturi channel and (b) its gas dispensing nozzles facing said throat portion of said venturi channel.

10. Apparatus as set forth in claim 9, wherein said cylindrical housing and each of said pair of transverse walls spans the distance between said pair of spaced apart side walls.

11. Apparatus as set forth in claim 10, wherein said pair of side walls are parallel to each other, and said cylindrical housing of said inflator has a central axis disposed perpendicular to said pair of parallel side walls.

12. Apparatus as set forth in claim 7, wherein said reaction device includes flange structure connected with the portions of said side walls and transverse walls defining said gas outlet opening, said flange structure being adapted for attachment to a vehicle air bag.

13. Apparatus as set forth in claim 8, wherein each of said side walls has a rear edge portion, each of said transverse walls has a rear edge defining the wide end of said converging portion of said venturi channel, said rear edges of said transverse walls and said rear edge portions of said side walls forming said air intake opening.

14. Apparatus as set forth in claim 13, wherein the flow area of said air intake opening is substantially greater than the flow area of said gas outlet opening.

15. A reaction device for an air bag assembly, comprising:
   a pair of spaced apart side walls;
   a pair of spaced apart transverse walls extending between and connecting said side walls, said spaced apart side walls being adapted to support an air bag inflator;
   said spaced apart side walls and said spaced apart transverse walls cooperating to define:
   (i) an air intake opening,
   (ii) a gas outlet opening,
   (iii) a venturi channel terminating in said gas outlet opening, and
   (iv) an aspiration passage between said air intake opening and said venturi channel.

16. Apparatus for forming an air bag assembly, comprising a reaction device and a cylindrical inflator connected to said reaction device, said reaction device comprising:
   a pair of spaced apart side walls, and
   a pair of spaced apart transverse walls extending between and connecting said side walls
   said spaced apart side walls and said spaced apart transverse walls cooperating to define
   (i) an air intake opening,
   (ii) a gas outlet opening,
   (iii) a venturi channel terminating in said gas outlet opening, and
   (iv) an air aspiration passage between said air intake opening and said venturi channel;
   said cylindrical inflator having a cylindrical housing with gas dispensing nozzles formed in said housing, said cylindrical inflator being supported by said side walls and said cylindrical housing extending between said side walls.

17. Apparatus for forming an air bag assembly, comprising a reaction device and a cylindrical inflator supported by said reaction device,
   said reaction device comprising:
   a pair of spaced apart side walls, and
   a pair of spaced apart transverse walls extending between and connecting said side walls,
   said spaced apart side walls and said spaced apart transverse walls cooperating to define
   (i) an air intake opening,
   (ii) a gas outlet opening,
   (iii) a venturi channel terminating in said gas outlet opening, and
   (iv) an air aspiration passage between said air intake opening and said venturi channel;
   said cylindrical inflator having a cylindrical housing with gas dispensing nozzles formed in said housing, said cylindrical housing having a central axis disposed transverse to said pair of side walls.

18. Apparatus as set forth in claim 17 wherein said inflator is located with (a) a part of its cylindrical housing disposed within the converging portion of said venturi channel and (b) its gas dispensing nozzles facing said throat portion of said venturi channel.

19. Apparatus as set forth in claim 18, wherein said cylindrical housing and each of said pair of transverse walls spans the distance between said pair of spaced apart side walls.

* * * * *